United States Patent [19]

Courtney

[11] 4,038,879
[45] Aug. 2, 1977

[54] PULLEY BELT AND ITS INHERENT INSTALLATION DEVICE

[75] Inventor: James Courtney, Miami, Fla.

[73] Assignee: Jerome H. Lacheen, Philadelphia, Pa.

[21] Appl. No.: 708,558

[22] Filed: July 26, 1976

[51] Int. Cl.² ............................................. F16G 1/00
[52] U.S. Cl. ................................................. 74/231 J
[58] Field of Search .......................... 74/231 R, 231 J

[56] References Cited
FOREIGN PATENT DOCUMENTS 2,420,249  11/1975  Germany ........................... 74/231 J Primary Examiner—Leonard H. Gerin
Attorney, Agent, or Firm—Jerome H. Lacheen

[57] ABSTRACT

A device for installing Pulley Belts such as automobile fan belts without having to move any of the Pulley's from their proper position including rubber or the like belts having a core of synthetic material and a pocket of bonding material located at one end of the belt. A plastic attaching mechanism including a pair of meshing gears and a belt track for positioning the ends of the belt for bonding.

9 Claims, 3 Drawing Figures

PULLEY BELT AND ITS INHERENT INSTALLATION DEVICE

The invention relates to a Pulley Belt which can be installed by a lay person without the necessity of calling a mechanic.

In the past, the breaking of a pulley belt such as the fan belt of an automobile, would cost the owner of the disabled automobile much inconvenience and money in the repair job that had to be done at a garage. This came about due to the fact that belts of this type were endless and therefore the pulleys had to be loosened and pulled apart, and other belts and hoses had to be disconnected in order for the one-piece belt to be installed.

The instant invention reduces these problems and expenses by providing a two-ended belt which can be installed by a layman at the scene of the problem.

It is therefore an object of the instant invention to provide a two-ended pulley belt which can be installed and made endless by a layman at the scene.

Another object is the provision of a throw-away attaching device which is inexpensive and which will be supplied with each belt.

The above objects as well as others together with the benefits and advantages of the invention will be apparent upon reference to the detailed description set forth below, particularly when taken in conjunction with the drawings annexed hereto in which.

Figure 1:
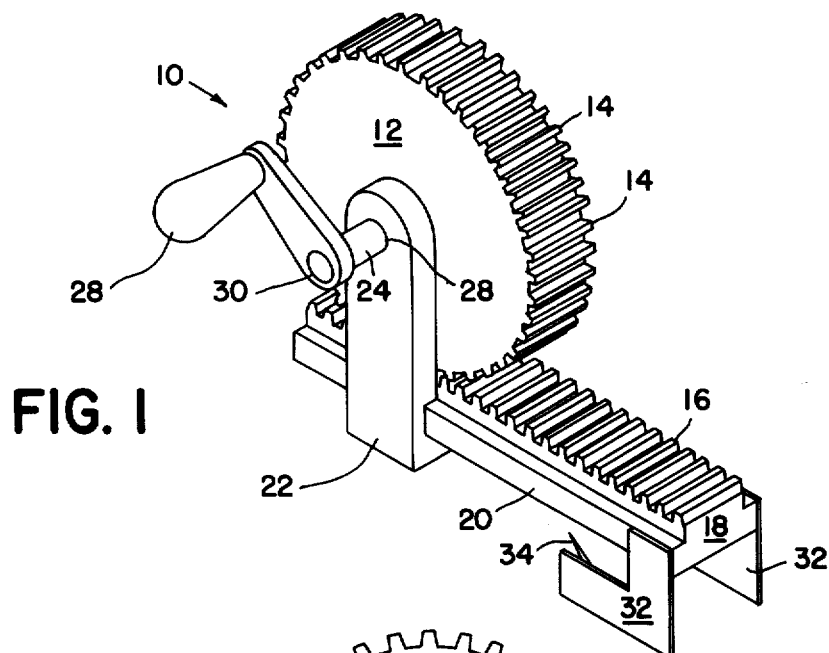
FIG. 1 Illustrates a perspective view of the attaching mechanism of the instant invention.
Figure 2:
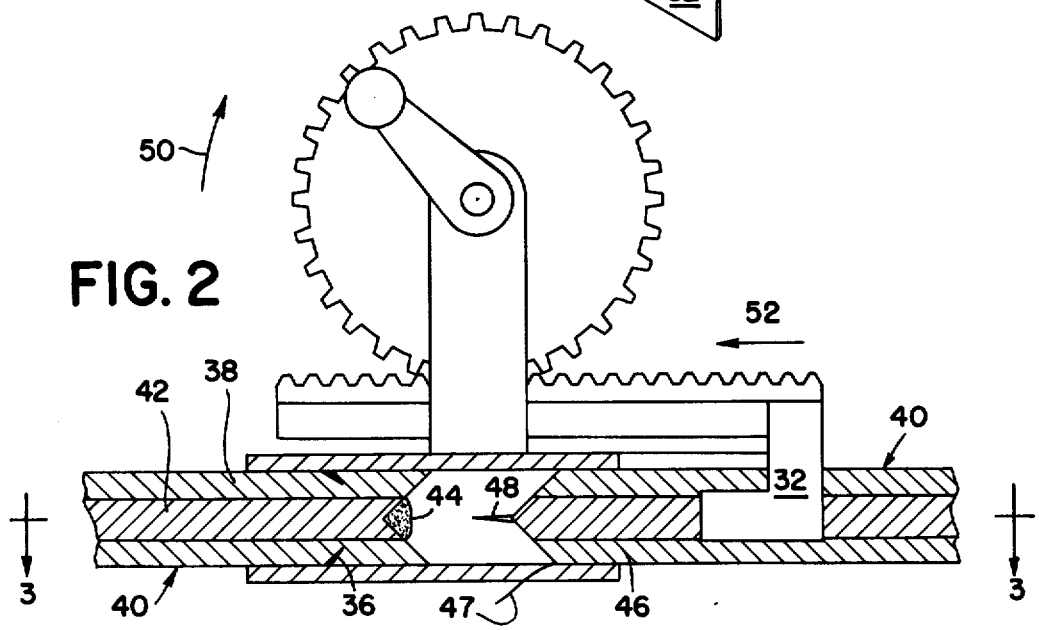
FIG. 2 Shows a side view of the attaching mechanism with the belt newly drawn together.
Figure 3:
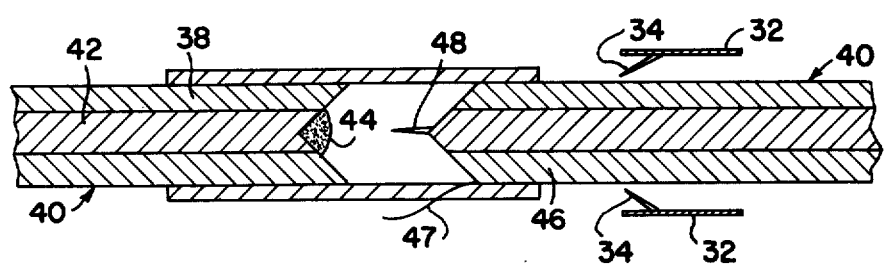
FIG. 3 Shows a view taken in the direction of the lines 3 — 3 of FIG. 2.

Referring now to the drawings, FIG. 1 shows the attaching mechanism 10 which is manufactured of a plastic material so that it can be disposed of after use. The mechanism 10 includes a movable circular gear 12 which meshes by way of a series of teeth 14 with a series of teeth 10 of a flat stationary gear 18. The flat gear 18 has a lip 20 on which is mounted a gear support 22. This support 22 has a hold 26 through which an axel shaft 24 passes and is secured to gear 12 at one end. At the other end an L-shaped 28 is secured by way of hole 30 through which passes a pair of L-shaped meshes 32 are attached to lip 20 each having a pin 34 which is fixed at a 45° angle. Another set of pins 36, see FIG. 2, is attached to lip 20 at the opposite end and are also set at a 45° angle.

In operation, one end 38 of the belt is inserted into the mechanism 10 under the lip 20 past the pins 36 and secured thereto by reversing direction of the belt end 38 so that the pins 36 insert themselves into the belt. The belt is constructed of rubber or the like and has an inner core 42 of synthetic material such as nylon. Attached at the end of the belt end 38 is a pocket 44 containing a bonding medium, such as crazy glue, which will adhere to the nylon core 42 which runs the entire length of the belt 40. The other end 46 of the belt 40 is constructed in an opposite shape for the end 38 so as to make a perfect fit and contains a needle 48. This end 46 is directed around the pulley (not shown) by a flexible material 47 and inserted in the other end of lip 20 between the brackets 32 and just past the pins 34. This is, of course, after the belt has been placed around the appropriate pulleys. The belt is then moved in the opposite direction of the pins 34 so as to secure the belt onto the pins. Once the belt is in position, the handle 28 is turned in the direction of arrow 50 causing the teeth 14 to move the teeth 16 in the direction of the arrow 52. This movement causes the belt end 38 to join the belt end 46 thereby causing the pin 48 to break the pocket 44 along its glue in pocket 44 to come into contact with the nylon core 42 and adhering thereto. Once the glue sets the mechanism 10 can be broken away and the belt is secure in place.

I wish it understood that I do not desire to be limited to the exact details of construction shown and described, for obvious modification will occur to a person skilled in the art.

I claim:

1. A Pulley Belt comprising
   a two-ended belt,
   a synthetic core passing through the entire length of the belt,
   one end of the belt containing a pocket of adhering means,
   the other end of the belt containing a pin on the end thereof 2. A belt of the type described in Claim 1 wherein the shape of each end of the belt is opposite the other end.

3. A belt of the type described in claim 2 including an attaching mechanism,
   means to secure said attaching mechanism to said belt,
   means to bring the ends of said belt together 4. A belt of the type described in claim 3 wherein said means to secure said attaching means to said belt includes
   a pair of 45° pins located at each end of said attaching means.

5. A belt of the type described in claim 4 wherein said means to bring the ends of said belt together includes
   a movable circular gear containing teeth thereon,
   a stationary flat gear containing teeth thereon, means to move said movable gear.

6. A belt of the type described in claim 5 wherein said gear teeth on both gears are meshable.

7. A belt of the type described in claim 6 wherein said means to move said movable gear includes
   an L-shaped handle,
   an axel shaft attached to one end of said L-shaped handle, and to the movable gear.

8. A belt of the type described in claim 3 wherein said attaching mechanism is made of a plastic material.

9. A belt of the type described in claim 2 including a flexible material for guiding the belt around the appropriate pulley.

* * * * *